(12) United States Patent
Schmitt et al.

(10) Patent No.: US 8,344,287 B2
(45) Date of Patent: Jan. 1, 2013

(54) METHOD FOR DETERMINATION OF ELECTRICAL WELDING CIRCUIT VARIABLES

(75) Inventors: Klaus-Gisbert Schmitt, Giessen (DE); Udo Schulz, Weinbach (DE); Wolfgang Schmidt, Reiskirchen (DE); Heiko Scheffler, Buseck (DE)

(73) Assignee: Newfrey LLC, Newark, DE (US)

( * ) Notice: Subject to any disclaimer, the term of this patent is extended or adjusted under 35 U.S.C. 154(b) by 537 days.

(21) Appl. No.: 12/620,197

(22) Filed: Nov. 17, 2009

(65) Prior Publication Data

US 2010/0288735 A1 Nov. 18, 2010

(30) Foreign Application Priority Data

Nov. 17, 2008 (DE) .......................... 10 2008 058 753

(51) Int. Cl.
*B23K 9/095* (2006.01)

(52) U.S. Cl. ................ 219/130.01; 219/99; 219/130.33; 219/136

(58) Field of Classification Search .................... 219/99, 219/130.01, 130.33, 136
See application file for complete search history.

(56) References Cited

U.S. PATENT DOCUMENTS

| | | |
|---|---|---|
| 6,710,297 B1 | 3/2004 | Artelsmair et al. |
| 2008/0264916 A1* | 10/2008 | Nagano et al. ........... 219/130.33 |

FOREIGN PATENT DOCUMENTS

| | | |
|---|---|---|
| DE | 102005053438 A | 5/2007 |
| EP | 1183125 B | 8/2004 |

* cited by examiner

*Primary Examiner* — Minchul Yang
(74) *Attorney, Agent, or Firm* — Michael P. Leary

(57) ABSTRACT

A method for determination of electrical variables of a welding circuit which is connected to an electrical power supply device and operable to provide either a welding current or a lesser pilot current, the method including the steps of (a) determining the resistance of the welding circuit and (b) determining the inductance of the welding circuit.

11 Claims, 3 Drawing Sheets

METHOD FOR DETERMINATION OF ELECTRICAL WELDING CIRCUIT VARIABLES

CROSS-REFERENCE TO RELATED APPLICATIONS

This application claims priority from German Patent Application No. 10 2008 058 753.2, filed on Nov. 17, 2008, the disclosure of which is incorporated herein by reference.

FIELD OF THE INVENTION

The present invention relates to a method for determination of electrical variables of a welding circuit which is connected to an electrical power supply device. The present invention also relates to a method for controlling a welding process, and to a welding apparatus such as a stud welding installation.

A stud welding installation for welding studs onto workpieces using an arc which is struck in the course of the drawn-arc welding has a power supply device which is connected to a welding head, which holds the stud, via at least one connecting line which forms part of a welding circuit, and furthermore has a control device.

In modern stud welding installations, the arc voltage is measured in order to allow the process to be better controlled and the welding results to be checked.

In order to measure the arc voltage, it is known for measurement lines to be laid parallel to the connecting lines from the power supply device to the welding head. This allows the arc voltage between the stud holder and the earth connections on the workpiece to be measured directly. This method is very accurate but is susceptible to mechanical faults and may necessitate shutdown times for fault rectification.

Measurement of arc voltage directly at the output terminals of the power supply device is highly susceptible to errors. This is because the connecting line to the welding head includes an electrical resistance (non-reactive resistance) and an inductance. When carrying out measurements at the output terminals of the power supply device, the voltage drop across the resistance and the inductance of the connecting line(s) are not measured. This can cause measurement errors of more than 50%.

It is also known for the resistance of the welding circuit to be measured by means of an additional electrical circuit. In this case, the voltage drop across the resistance of the welding circuit is subtracted from the voltage measured at the output terminals of the power supply device, thus resulting in a calculated arc voltage whose inaccuracy is caused primarily by ignoring the voltage drop across the welding circuit inductance.

Document EP 1 183 125 B1 discloses a method for determination of the welding process voltage, in which the welding process voltage is determined between a workpiece and a welding head for continuous arc welding with a consumable electrode. The welding process voltage is calculated in real time taking account of the disturbance variables comprising the inductance and resistance of a welding installation, using a mesh (also called "loop") equation, with the inductance and the resistance being determined by static measurement methods. The static calculation of the disturbance variables can be carried out in this case when a short circuit is created between the electrode and the workpiece.

DE 10 2005 053 438 A1 discloses a method for quality checking during stud welding on electrically conductive components. In this case, after the welding time, the pressure force which presses the stud onto the component is maintained, with a test current being passed, after a waiting time following the welding time, for a specific test time through a welding transformer, in particular a constant test-current pulse. The test current which flows through the stud as a result of the test current pulse is determined, and the value of the test current is compared with previously determined comparative values in order to check the quality of the weld that is produced.

Against the above background, one object of the present invention is to specify a better method and a better apparatus for determination of electrical variables of a welding circuit, which is particularly suitable for stud welding installations.

The above object is achieved by a method for determination of electrical variables of a welding circuit which is connected to an electrical power supply device which is designed to provide either a welding current or a lesser pilot current, with the power supply device having an input circuit for providing the pilot current, which input circuit is bridged (bypassed or shunted) in order to provide the welding current, having the following steps:

(a) determination of a first electrical variable when the input circuit is not bridged, and (b) determination of a second electrical variable when the input circuit is bridged.

Stud welding installations, which operate using the drawn-arc welding method, include the capability to first of all pass a relatively small pilot current of, for example, 20 amperes through the welding circuit, by means of which the arc can be struck. The actual welding current (up to 2000 amperes) is set only after this has been done. Modern stud welding installations make it possible to produce the bias or pilot current for production of the pilot current arc as well as the welding current for the actual welding process with the aid of a single energy source. Since the pilot current is very small in comparison to the welding current, the pilot current must be stabilized by means of a large inductance, which is part of an input circuit. This input circuit is bridged by means of a switch at the start of the welding current, in order not to limit the rate of rise of the welding current. The inductance of the input circuit may be 10,000 times greater than the inductance of the welding circuit.

If the first electrical variable of the welding circuit is determined in step a), then the inductance of the welding circuit can be ignored for this reason. The first electrical variable can thus be calculated ignoring the inductance of the welding circuit. By way of example, this may be done by using mesh equations which are known per se. In step b), the second electrical variable is determined, when the input circuit is bridged, that is to say the inductance of the input circuit is not also included in the measurement.

Since the electrical variables of the welding circuit can be determined in this way, the arc voltage can be calculated easily and accurately without any additional hardware complexity. There is no need for any measurement lines to the welding head.

According to the invention, the determination method described above can also be used in a method for controlling a welding process. Furthermore, the determination method can be used in a welding apparatus which has a power supply device and a control device which are designed to carry out the determination method.

In particular, the welding apparatus may be of the type described above, which has a control device designed to carry out the determination method according to the invention.

According to a second aspect of the invention, the above object is achieved by a method for controlling a welding process which can advantageously be combined with the determination method according to the first aspect of the invention, but does not have to be. In the method for controlling a welding process according to the second aspect of the invention, a mathematical model of the welding circuit forms a control observer and with at least one welding parameter being set as a function of a state variable contained in the observer.

The object is therefore completely achieved.

In the first aspect of the present invention, it is particularly preferable for the first electrical variable to be the electrical resistance of the welding circuit.

This is the case in particular when the inductance of the welding circuit is very much less than the inductance of the pilot circuit, and in consequence can be ignored in the determination of the electrical resistance.

Accordingly, it is likewise advantageous for the second electrical variable to be the inductance of the welding circuit.

When the input circuit is bridged, the inductance of the input circuit is ineffective, as a result of which the inductance of the welding circuit can be determined.

Overall, it is also preferable for step a) and/or step b) to be carried out in the course of a welding process.

This allows the electrical variables of the welding circuit to be determined "online", that is to say in real time relating to the actual welding process. In consequence, it is possible to ensure that the electrical variables are determined correctly at the time of the welding process.

It is particularly advantageous in this case for step a) to be carried out while the weld stud is in contact with the work piece and when a welding voltage is short-circuited and the pilot current is switched on.

By way of example, this can be done in the course of a stud welding process when the stud is placed on the workpiece and the pilot current is switched on, that is to say shortly before the arc is struck.

According to a further preferred embodiment, the step b) is carried out when a welding voltage is short-circuited and before the current is increased from the pilot current to the welding current.

In this case, the step b) is carried out in the case of a stud welding process, for example, when the stud is placed on the workpiece and the pilot current is switched on. In this case, the input circuit is bridged for the purpose of determination of the second electrical variable. In this case, the welding circuit is preferably bridged for a short measurement time period in order subsequently to allow the stud to be lifted off the workpiece, for drawn-arc welding when the input circuit is once again not bridged. This is because, in this case, the relatively high inductance of the input circuit is necessary in order to stabilize the current.

A thyristor is preferably used to bridge the input circuit. This can admittedly be switched on "on load" in order to start the measurement time period. In this case, once the measurement time period has ended, it may be necessary to briefly reduce the pilot current to zero again, since a thyristor in general cannot be switched off on load. This is no problem when using a clocked switched-mode power supply, as is used in modern power supply devices.

The measurement time period is referred to in the present case as the determination time period.

According to the embodiment described above, the second electrical variable is preferably determined before the welding current is switched on. According to an alternative embodiment, it is possible to carry out the step b) while the welding current is falling, that is to say after the welding current has been switched on, and after a welding voltage has once again been short-circuited.

In the case of a stud welding process, for example, this can be done as soon as the stud is lowered onto the workpiece after the melting of the surfaces. In this case, the arc, that is to say the welding voltage, is short-circuited. Although the current is in this case generally switched off immediately, it falls relatively slowly, however, because of the inductance in the welding circuit. The step b) can be carried out until the time at which the welding current has fallen to zero again.

Although it is preferable to determine the electrical variables of the welding circuit during the course of a welding process, it is, of course, also possible to carry out the step a) and/or the step b) before or after a welding process, that is to say "offline". In this case, the electrical variables may, if required, be determined completely independently of a welding process, that is to say for example every 10, 100 or 1000 welding processes. Since the electrical variables do not generally change quickly, it may be sufficient to determine them only at intervals such as these.

It is particularly preferable for the result of the step a) for determination of the first electrical variable to be used in step b) for determination of the second electrical variable.

Since, in step b) by way of example, both the resistance and the inductance are present in the welding circuit and the inductance is not negligible, the inductance can be established in a simple manner, if the resistance has already been determined.

In the method for controlling a welding process using the electrical variables of the welding circuit determined according to the invention, it is possible, for example, to identify changes in the dI/dt of the welding current which are caused by changes in the electrical variables. Changes such as these can then be compensated for by lengthening or shortening the welding times, to be precise "online" and on a position-related basis.

Furthermore changes in the dI/dt of the welding current can be identified which are caused by changes in the welding voltage, in particular in the arc voltage, to be precise in particular when the current is constant. These changes can once again be compensated for in a corresponding manner, as described above.

Furthermore, when the electrical variables of the welding circuit are known, event triggering of the welding process, controlled by the welding voltage, in particular the arc voltage, can be carried out more easily, for example short-circuit identification. In the event of short circuits, event triggering during welding can be used to switch the welding current off very quickly, preferably in time intervals of <1 to 10 μs, and thus to reduce it so far that the triggering of the short circuit between the stud and the workpiece can be carried out smoothly and without any major explosions in the liquid short-circuiting link (weld puddle). Furthermore, event triggering can result in the welding current being switched on again at the original level or at a different level, with the short circuit being triggered immediately after the occurrence of a new arc. This can be done at time intervals of <1 μs to 100 μs.

Both are expediently done with the aid of a clocked half-bridge or full-bridge transistor circuit in the power supply unit, whose clock frequency may be between 20 kHz and 200 kHz.

Furthermore, the electrical variables determined in this way can be integrated in the parameter monitoring of the welding circuit in order to make it possible to make statements about the necessary servicing or maintenance operations for the welding circuit or the stud welding installation.

Overall, it is particularly preferable that the method according to the invention, for determination of electrical variables can be carried out without any need for additional hardware complexity. In fact, the power supply devices which are present in any case in particular in stud welding installations, including the input circuit contained therein and including the switchability of the input circuit, are used in order to carry out the method according to the invention.

The power supply device preferably contains a clocked energy source, which produces the welding current either as direct current and/or as alternating current.

It is self-evident that the features mentioned above and the features which are still to be explained in the following text can be used not only in the respectively stated combination but also in other combinations or on their own without departing from the scope of the present invention.

BRIEF DESCRIPTION OF THE DRAWINGS

Exemplary embodiments of the invention will be explained in more detail in the following description, and are illustrated in the drawing, in which.

DETAILED DESCRIPTION OF EXEMPLARY EMBODIMENTS OF THE INVENTION

Figure 1:
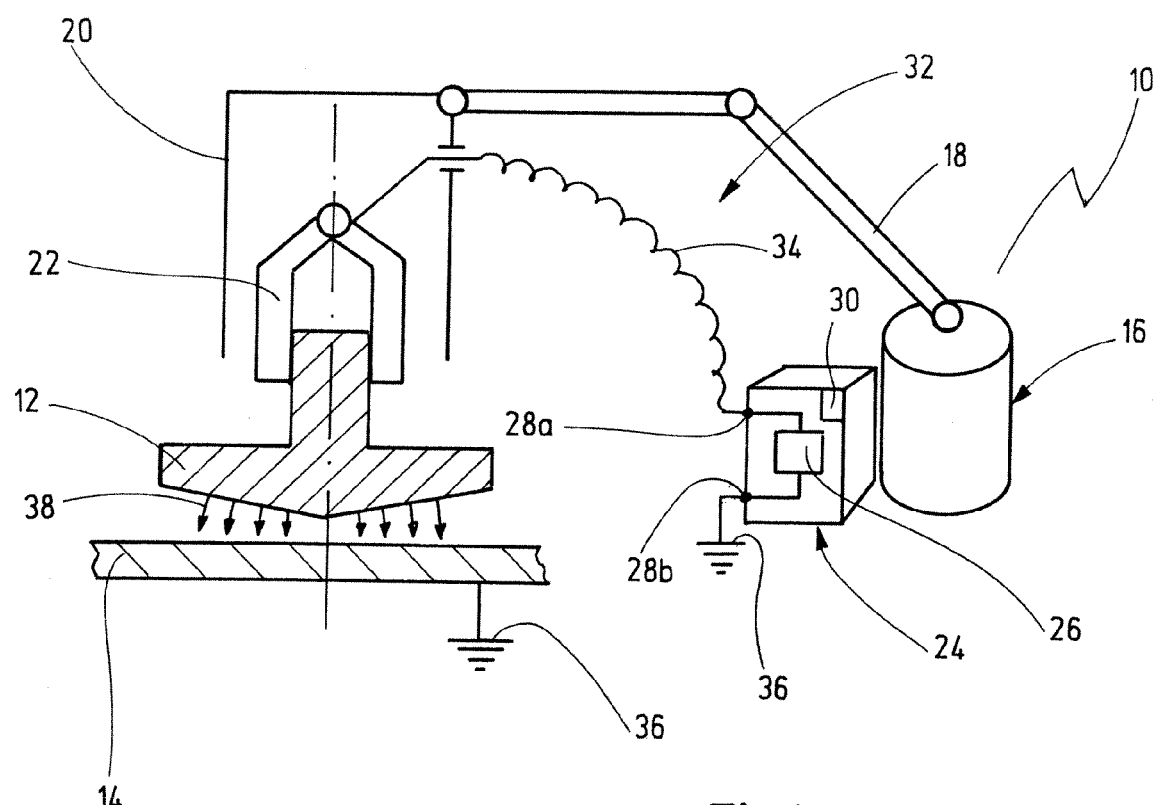
FIG. 1 shows a schematic illustration of a stud welding installation.

In FIG. 1, a stud welding installation is annotated 10, in general. The stud welding installation 10 is used in each case to weld a stud 12 composed of an electrically conductive material to a workpiece 14 composed of an electrically conductive material.

The stud welding installation 10 contains a robot 16 which has at least one arm 18. A welding head 20 is arranged at the end of the arm 18. An electrically conductive stud holder 22 is provided in the welding head 20, and in each case holds a stud 12 to be welded on.

As an alternative to this, the welding head 20 can also be provided on a welding gun which is operated by hand.

Furthermore, the stud welding installation 10 contains a power supply device 24, containing power electronics 26 in order to provide a current source. The power supply device 24 has output terminals 28a, 28b at which a welding circuit voltage is provided.

The power supply device 24 has an associated control device 30 which controls the welding process procedure.

A welding circuit 32 is connected to the output terminals 28a, 28b and contains at least one connecting line 34 from the power supply device 24 to the welding head 20. In general, the two output terminals 28a, 28b can be connected to the welding head 20 via respective connecting lines.

As an alternative to this, one of the output terminals (28b) is connected to earth 36, as illustrated in FIG. 1.

In this case, the workpiece 14 is likewise connected to earth 36, as is likewise illustrated in FIG. 1.

An arc which is struck during the stud-welding process is shown at 38.

Figure 2:
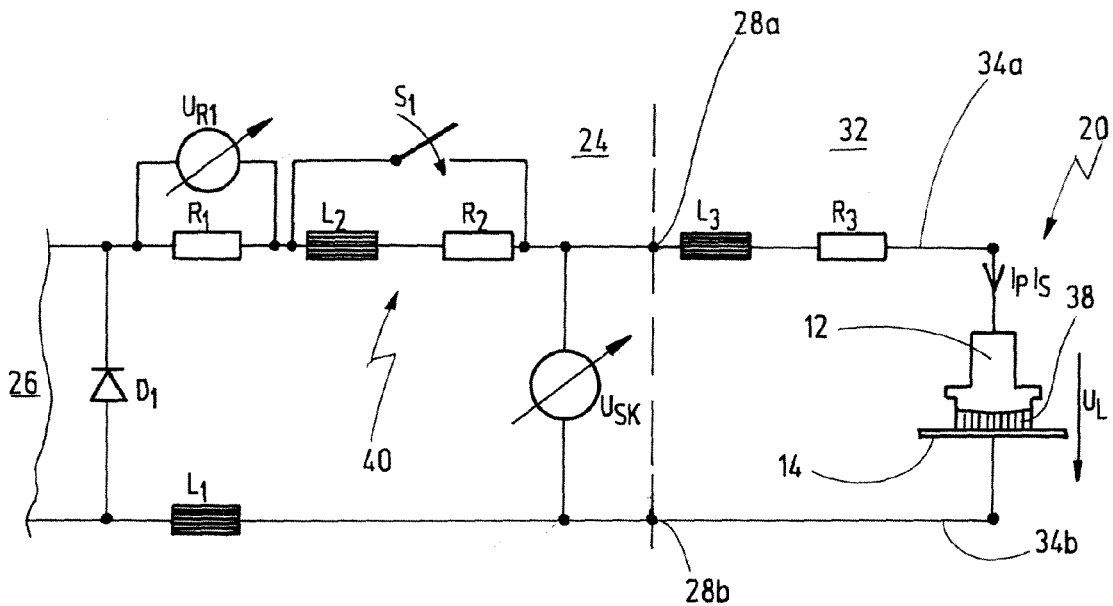
FIG. 2 shows a circuit diagram of the electrical variables of an input circuit of a power supply device and of a welding circuit.

FIG. 2 shows a circuit diagram of a part of the power supply device 24 and of the welding circuit 32.

Because of the connecting line 34, the welding circuit 32 essentially has an inductance $L_3$ and an electrical resistance $R_3$. When an arc is struck between the stud 12 and the workpiece 14, an arc voltage $U_L$ is dropped across this arc 38. During the course of the welding process, either a pilot current $I_p$ or a welding current $I_s$ flows through the welding circuit 32.

The power supply device 24 has power electronics, which are not illustrated in any more detail but provide a current at two terminals (shown on the left in FIG. 2). A diode $D_1$ is connected in parallel with the terminals. Furthermore, the power supply device 24 contains an inductance $L_1$ although, in the present case, this can be ignored.

A measurement resistance $R_1$ and an input circuit 40 are connected in series between the diode $D_1$ and the output terminals 28a, 28b. A voltage $U_{R1}$ is dropped across the measurement resistance $R_1$. Since the resistance $R_1$ is known, the current which is in each case flowing in the welding circuit 32 can be determined from the measurement of the voltage $U_{R1}$. A measurement device for measurement of the welding circuit voltage $U_{SK}$ is connected in parallel with the output terminals 28a, 28b. The input circuit 40, which is arranged between the measurement resistance $R_1$ and one of the output terminals 28a, contains a very high inductance $L_2$ and a resistor $R_2$. The input circuit 40 can be bridged by means of a switch $S_1$.

The known variables of the illustrated circuit diagram are $L_1$, $R_1$, $L_2$, $R_2$, the voltage $U_{D1}$ dropped across the diode $D_1$, the voltage $U_{R1}$ dropped across the resistance $R_1$, and the welding circuit voltage $U_{SK}$. It is important to know the respective arc voltage $U_L$ as accurately as possible, in order to control the welding process. As described initially, this can be measured by means of a suitable measurement device with measurement terminals directly on the stud 12 (or the stud holder 22) and on the workpiece 14. In the present case, the arc voltage $U_L$ can, however, be determined in a similarly precise manner by measuring just the welding circuit voltage $U_{SK}$. One precondition for this is that the respective electrical variables of the welding circuit 32 are known, that is to say the inductance $L_3$ and the resistance $R_3$.

The resistance $R_3$ can be determined by calculation with the switch $S_1$ open by formulation of a mesh equation, to be precise when the arc is short-circuited (that is to say $U_L=0$).

For this situation, the voltage $U_{L3}$ dropped across the inductance is negligible, and is set to zero, since $L_2 \gg L_3$.

In consequence, the mesh equation is as follows:

$$U_{L1}+U_{D1}+U_{R1}+U_{L2}+U_{R2}+U_{R3}=0 \text{ or}$$

$$U_{Sk}+U_{R3}=0$$

Since $U_{Sk}$ is measured and the current flowing through the welding circuit 32 is known by measurement of $U_{R1}$, the voltage $U_{R3}$ can be determined from this equation, and in consequence electrical resistance $R_3$ can also be determined from this, using $U=R\cdot I$.

In a second step for determination of the inductance $L_3$, the switch $S_1$ is closed. In this case, the arc is still short-circuited (that is to say $U_L=0$).

In this situation, the mesh equation is then:

$$U_{L1}+U_{D1}+U_{R1}+U_{L3}+U_{R3}=0 \text{ or}$$

$$U_{Sk}+U_{L3}+U_{R3}=0$$

Since $R_3$ and consequently $U_{R3}$ are known, $L_3$ is in consequence determined by calculating using the equation $U_{L3}=L_3\cdot dI/dt$.

Once $L_3$ and $R_3$ have been determined, the arc voltage $U_L$ can be determined in a simple manner, when the arc is burning, from the following mesh equation:

$$U_{SK}+U_{L3}+U_{R3}+U_L=0$$

Figure 3:
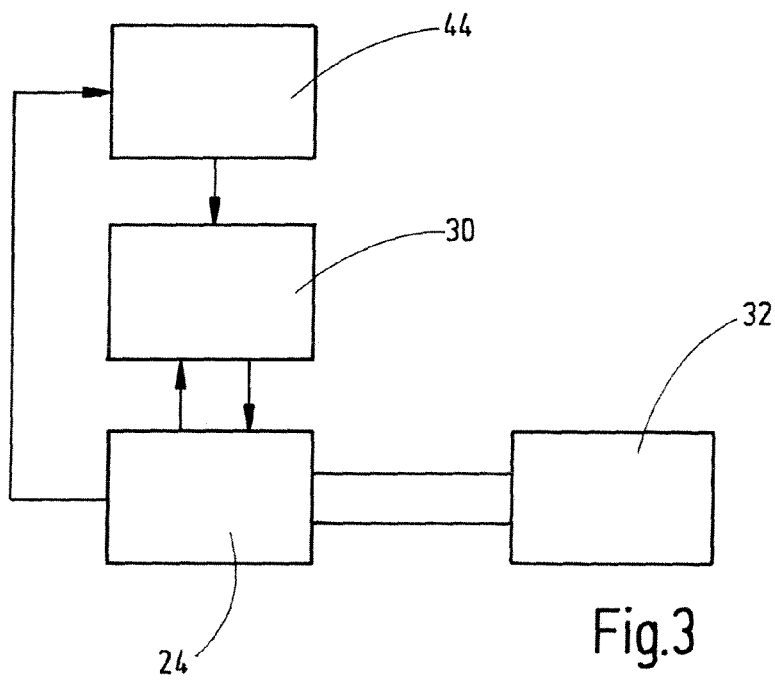
FIG. 3 shows a schematic illustration of an electrical power supply device with a control observer.

FIG. 3 shows, schematically, the option of integration of an observer in the welding control process.

Mathematical models can be determined for the welding circuit 32 and, if required, for the power supply device 24 and may be the subject matter of a control observer 44. The observer 44 in this case mathematically simulates the state variables which in each case exist in the welding process, in parallel with the actual welding process. This allows even those variables which cannot be recorded directly by measurement to be determined by means of the observer state variables. The fundamental principle of a control observer 44 is known. The state variables are determined from measurable input and output variables of the observer 44. The state variables which are used and calculated in the observer 44 can be used to determine the welding control, to be precise either in their own right or in a redundant form, or for checking the plausibility of measurement results.

Since a very large number of components with their own tolerances and dependencies influence the welding process, this dependency can be reduced, and in the ideal case eliminated, by the observer 44.

Figure 4:
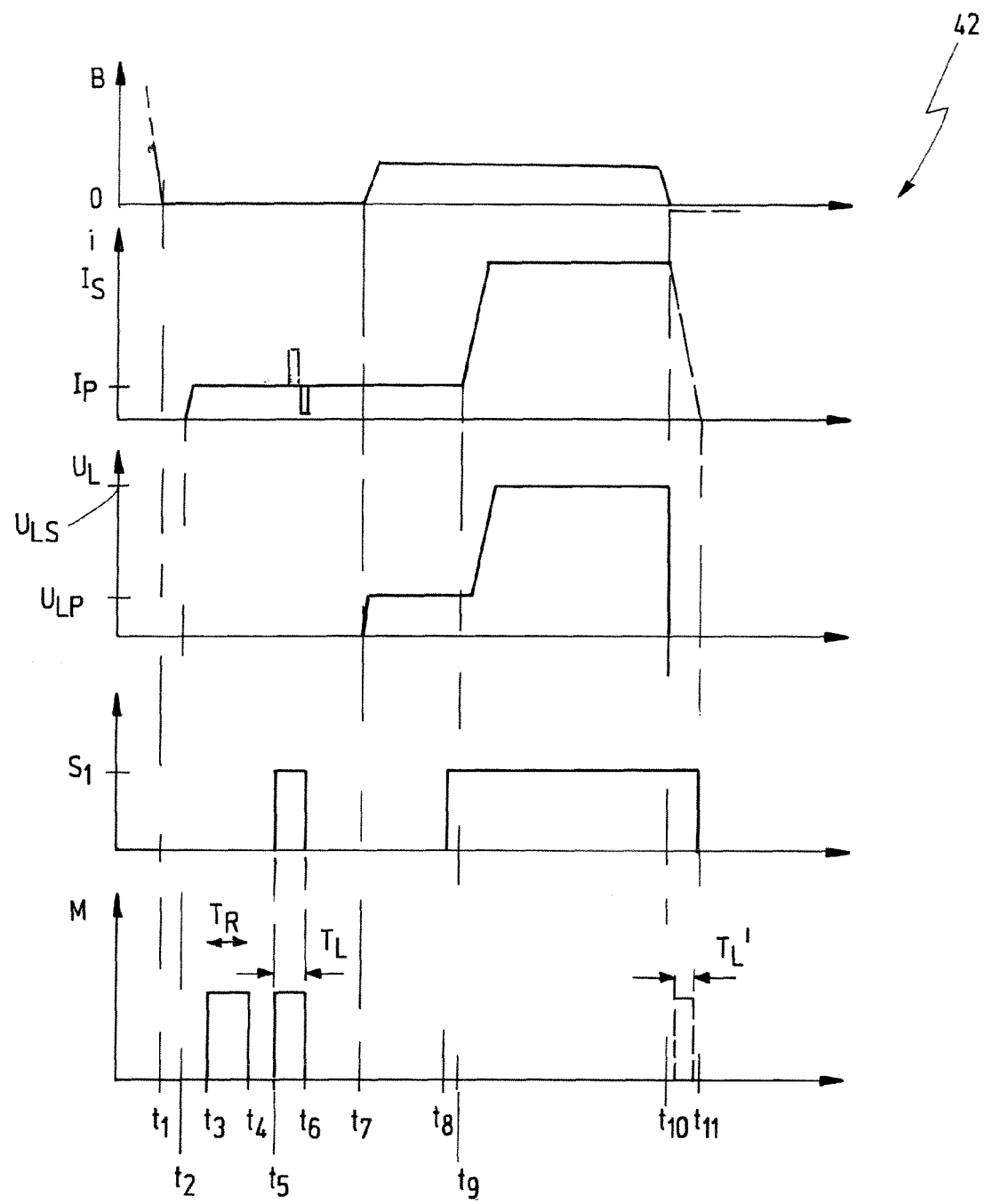
FIG. 4 shows timing diagrams of the stud movement, of the current, of the arc voltage, of the switch position of an input circuit and of the determination time periods during a welding process.

FIG. 4 shows a welding process 42 and the option of integration of determination time periods for determination of electrical variables of the welding circuit, in a schematic form.

In FIG. 4, B denotes the stud movement with respect to the workpiece 14. When this is zero, the stud 12 is touching the workpiece 14 and $U_L$ is short circuited.

The values of the welding current $I_s$ and the values of the pilot current $I_p$ are plotted in the timing diagram of the current i. In a corresponding manner, the arc voltage in the diagram is $U_L$. The relative magnitudes of the arc voltages and of the currents are not shown to scale, but distorted in order to illustrate them better.

In the diagram, $S_1$ represents the position of the switch $S_1$. Finally, the determination time periods are plotted in the diagram M.

The stud welding process is carried out by first of all lowering the stud 12 onto the workpiece 14 until it meets the workpiece 14 (time $t_1$). The pilot current $I_p$ is then switched on (at the time $t_2$).

At a time $t_7$, the stud 12 is lifted off the workpiece 14, so that an arc is struck and a corresponding pilot arc voltage $U_{LP}$ is created. The input circuit is bridged at a time $t_8$, that is to say the switch $S_1$ is closed. The current is then increased to the welding current $I_S$ (at the time $t_9$). The relatively high welding current of up to 2000 amperes results in the mutually opposite surfaces of the stud 12 and of the workpiece 14 being fused. At a time $t_{10}$, the stud 12 is lowered onto the workpiece 14 again, to be precise to below the null position, in order to thoroughly mix the melts (time $t_{10}$). The welding current is then switched off. As soon as this welding current is zero, the switch $S_1$ can also be opened again (time $t_{11}$).

The determination of the electrical resistance $R_3$ can be carried out in a determination time period $T_R$ which starts at a time $t_3$, that is to say when the pilot current $I_p$ is switched on and the arc voltage $U_L$ is still short-circuited. The determination time period $T_R$ ends at $t_4$.

Following this, the inductance $L_3$ can be determined in a second determination time period $T_L$, that is to say from a time $t_5$ to a time $t_6$. In this case as well, the arc voltage $U_L$ is still short-circuited. In this case, the switch $S_1$ is closed for the determination time period $T_L$. After the determination time period $T_L$, the switch $S_1$ is opened again, in order to stabilize the current at the time $t_7$, when the arc is struck. If the switch $S_1$ is in the form of a thyristor, it may be necessary to briefly reduce the pilot current $I_p$ to zero again in order to switch the thyristor without any load on it, in order that it can be opened at $t_6$. This is illustrated schematically in the diagram of the current. Furthermore, the diagram of the current shows that the current can be changed during the determination time period $T_L$, in order to allow the inductance to be measured on the basis of the change in the current (dI/dt).

FIG. 4 also shows that the inductance $L_3$ can also be determined between the times $t_{10}$ and $t_{11}$ (determination time period $T_L'$).

The measurement recording of the voltages $U_{R1}$ and $U_{SK}$ is expediently carried out outside the switching-on and switching-off processes of the power transistors in the power supply device, to be precise preferably at least twice during the time interval in which the transistors are reliably switched on and/or off. This then also allows determination of the dI/dt values required for calculation, and the mean values of $I_p$ and $I_s$.

The measurements for recording and calculation of the time profiles need not be carried out in time with the switching frequency of the power transistors 1:1, but may be reduced by a factor of up to 1:10, depending on the resolution requirement.

As described above, the measurements for calculation of $R_3$ can be carried out in the short-circuited phase, before the arc is struck. The measurements for calculation of $L_3$ can be carried out either in this short-circuited phase before the striking of the arc, or in the short-circuited phase after quenching of the arc as described above with reference to $T_L$ and $T_L'$.

The time profiles can be calculated offline after the end of the welding process for assessment by the welding parameter monitoring, or online, that is to say during the welding process, in order to carry out process control.

The calculation of the welding current may take account of the heating of the resistance $R_1$ as a result of the current level and current flow duration.

$R_3$ and $L_3$ need not be determined before each stud-welding process. In automatic installations with reproducible movement processes of the welding and earth lines, it is also permissible for these measurements to be carried out on a position-related basis only every 10, 100 or 1000 welding processes. Changes in the resistance $R_3$ can be assessed in the course of the welding parameter monitoring, thus leading to a "preventative maintenance" requirement when, as a result of fatigue, the resistance $R_3$ has become so great that it will shortly no longer be possible to carry out successful stud welding.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A method for determination of electrical variables ($R_3$, $L_3$) in a welding circuit (32) connected between an electrical welding power supply device (24) and a weld stud (12), the welding power supply device operable to provide one of a welding current ($I_s$) and a lesser pilot current ($I_p$), the power supply device (24) including an input circuit (40) for providing the pilot current ($I_p$), and the input circuit (40) is bridgeable in order to provide the welding current ($I_s$), the method for determination of electrical variables including the steps of:
(a) determining a first electrical variable ($R_3$) when the input circuit (40) is not bridged, and
(b) determining a second electrical variable ($L_3$) when the input circuit (40) is bridged.

2. A method for determination of electrical variables according to claim 1, wherein the first electrical variable is the electrical resistance ($R_3$) of the welding circuit (32).

3. A method for determination of electrical variables according to claim 2, wherein the second electrical variable is the inductance ($L_3$) of the welding circuit (32).

4. A method for determination of electrical variables according to claim 3, wherein the input circuit (40) includes an inductance ($L_2$), and the inductance of the input circuit is much greater than the welding circuit inductance ($L_3$).

5. A method for determination of electrical variables according to claim 4, wherein one of the step (a) and the step (b) is carried out during a welding process (42).

6. A method for determination of electrical variables according to claim 5, wherein the step (a) includes the steps of:
short circuiting a welding voltage ($U_L$); and
switching ON the pilot current ($I_p$).

7. A method for determination of electrical variables according to claim 6, and further including the following sequence of steps:
short circuiting the welding voltage ($U_L$);
determining the welding circuit inductance ($L_3$), and
increasing the pilot current ($I_p$) to the welding current (Is).

8. A method for determination of electrical variables according to claim 7, and further including the step of bridging the input circuit (40) for a determination time period ($T_L$) in order to determine the welding circuit inductance ($L_3$).

9. A method for determination of electrical variables according to claim 6, wherein the determination of the inductance ($L_3$) of the welding circuit (32) is carried out after a welding voltage ($U_L$) is once again short-circuited and while the welding current ($I_s$) is decreasing.

10. A method for determination of electrical variables according to claim 3, wherein a value determined for the electrical resistance ($R_3$) of the welding circuit (32) is then used in the step for determination of the inductance ($L_3$) of the welding circuit (32).

11. A method for determination of electrical variables in an arc welding apparatus, the arc welding apparatus comprising:
a welding head assembly including a stud holder for holding a weld stud, the welding head movable between a first position, wherein the weld stud is out of contact with a work piece, and a second position, wherein the weld stud contacts the work piece;
a power supply including power electronics operable for supplying a variable welding voltage to an output of the power supply, and the power electronics is operable to produce one of a pilot current and a welding current, and the welding current is much larger than the pilot current;
a current measuring circuit electrically connected between the power electronics and power supply output, the measuring circuit operable for measuring an electrical current to the weld head;
an input circuit electrically connected between the power electronics and the power supply output, the input circuit including a first inductance, a first resistance, and a bridge switch operable to bridge the first inductance and the first resistance;
a welding circuit electrically connected between the power supply device and the weld stud, the welding circuit having a welding circuit resistance and a welding circuit inductance, and the welding circuit inductance is much smaller than the first inductance of the input circuit; and
a voltage measuring device operable for measuring a voltage across the welding circuit; and
the method for determination of electrical variables including the steps of:
(a) placing the weld stud in the second position; then
(b) operating the electrical power supply device to produce the pilot current; then
(c) with the bridge switch open, measuring the electric current to the weld head and measuring the voltage across the welding circuit; then
(d) determining the welding circuit resistance, then
(e) closing the bridging switch to bridge the first inductance and the first resistance, then
(f) measuring a time rate of change of the pilot current, and then
(g) determining the welding circuit inductance.

* * * * *